(12) United States Patent
Ballas

(10) Patent No.: US 8,172,487 B2
(45) Date of Patent: May 8, 2012

(54) MILLING CUTTER AND CUTTING INSERT THEREFOR

(75) Inventor: Assaf Ballas, Akko (IL)

(73) Assignee: Iscar, Ltd., Tefen (IL)

( * ) Notice: Subject to any disclaimer, the term of this patent is extended or adjusted under 35 U.S.C. 154(b) by 508 days.

(21) Appl. No.: 12/488,326

(22) Filed: Jun. 19, 2009

(65) Prior Publication Data

US 2010/0034601 A1 Feb. 11, 2010

(30) Foreign Application Priority Data

Aug. 6, 2008 (IL) .......................................... 193284

(51) Int. Cl.
*B23C 5/20* (2006.01)
*B23B 27/22* (2006.01)
(52) U.S. Cl. ...................................... 407/113; 407/114
(58) Field of Classification Search .................. 407/113, 407/114, 115, 116
See application file for complete search history.

(56) References Cited

U.S. PATENT DOCUMENTS

| 4,808,044 | A |   | 2/1989 | Tsujimura et al. | |
|---|---|---|---|---|---|
| 5,052,863 | A |   | 10/1991 | Satran | |
| 5,071,292 | A |   | 12/1991 | Satran | |
| 5,383,750 | A |   | 1/1995 | Satran et al. | |
| 5,810,519 | A | * | 9/1998 | Vogel et al. | 407/114 |
| 5,967,710 | A | * | 10/1999 | Krenzer | 408/224 |
| 6,142,716 | A | * | 11/2000 | Jordberg et al. | 407/114 |
| 6,193,446 | B1 | * | 2/2001 | Astrom et al. | 407/114 |
| 6,196,770 | B1 | * | 3/2001 | Astrom et al. | 407/40 |
| 6,619,891 | B2 |   | 9/2003 | Hansson et al. | |
| 6,997,651 | B2 |   | 2/2006 | Kawai et al. | |
| 7,070,363 | B2 | * | 7/2006 | Long et al. | 407/113 |
| 7,452,167 | B2 | * | 11/2008 | Nishio et al. | 407/113 |
| 2002/0098049 | A1 | * | 7/2002 | Satran et al. | 407/113 |
| 2005/0084341 | A1 |   | 4/2005 | Long, II et al. | |

OTHER PUBLICATIONS

Office Action dated Sep. 25, 2011 issued in counterpart Israeli Patent Application (No. 193284).
International Search Report in PCT/IL2009/000638, dated Nov. 3, 2009.

* cited by examiner

*Primary Examiner* — Will Fridie, Jr.
(74) *Attorney, Agent, or Firm* — Womble Carlyle

(57) ABSTRACT

An indexable cutting insert and a milling cutter with identical indexable cutting inserts. The indexable cutting insert has an upper surface, opposing lower surface, and a peripheral side surface. Major cutting edges are formed on an upper peripheral edge, with adjacent major rake surfaces on the upper surface. At least two of the major cutting edges have different insert axial rake angles at equivalent index points along the major cutting edges, and at least two of the major rake surfaces have different rake surface profile angles at planar sections which are perpendicular to the major cutting edges and contain an insert axis. The milling cutter has a milling cutter body with a plurality of identical insert receiving pockets, where an equal number of the identical indexable cutting inserts are removably seated, having active major cutting edges and active major rake surfaces with different axial and/or radial rake angles.

16 Claims, 7 Drawing Sheets

MILLING CUTTER AND CUTTING INSERT THEREFOR

FIELD OF THE INVENTION

The present invention relates to an indexable cutting insert and a milling cutter with identical indexable cutting inserts, for use in metal cutting processes in general and milling cutting processes in particular.

BACKGROUND OF THE INVENTION

During certain rotating cutting tool operating conditions, vibration or chatter can occur, leading to accelerated tool wear, reduced level of surface finish, and in persistent cases spindle damage. To eliminate or reduce these vibrations without resorting to alternative tooling requires adjustment of the operating parameters, including cutting depth, cutting speed and feed rate, which can very often lead to reduced productivity and efficiency.

The following examples of prior art discuss alternative tooling inventions aimed at reducing/eliminating the negative effects of chatter or vibration whilst maintaining sufficiently high levels of machining efficiency, precision and quality.

U.S. Pat. No. 4,808,044 discloses a face milling cutter, including a cutter body and a plurality of identical cutting inserts detachably mounted in circumferentially spaced pockets formed in the cutter body. First and second recesses are formed in alternate pockets, where the first recess has a bottom facing generally in the direction of rotation and the second recess has a bottom slightly inclined relative to the first recess. Each insert has a generally quadrilateral shape with four main cutting edges formed at the intersection of a front rake face and four side faces, and a flat rear face which interfaces the recess bottom via a support member and is releasably secured by a wedge member. An insert mounted in a pocket with a first recess has a smaller axial rake angle and larger radial rake angle than an insert mounted in an adjacent pocket with a second recess. As a result of different axial and radial rake angles, the inserts in the first and second recesses are subjected to different impact forces on engagement to the workpiece, such that the cutter body is not resonated with the machine tool and chattering is prevented.

U.S. Pat. No. 6,619,891 discloses a milling tool, including a body and at least one set of circumferentially spaced identical cutting inserts detachably mounted on separate seats, where each set includes at least three cutting inserts. Each insert has an active cutting edge situated between a rake surface and a flank surface, where the rake surface faces generally in the direction of rotation and the flank surface faces generally radially outwardly. The seats on the tool body are arranged such that one of the cutting inserts has a clearance angle larger than the clearance angle of at least two other inserts in the same set. This combination results in a milling tool where the larger clearance angle insert generates a smoother surface finish with greater precision and the reduced clearance angle inserts tend to dampen vibrations and provide increased stability.

U.S. Pat. No. 6,997,651 discloses an end mill with a plurality of flutes formed in a cemented carbide cylindrical body, where each flute has an associated peripheral cutting edge and end cutting edge. First and second peripheral cutting edges are alternately arranged as viewed in a circumferential direction of the cylindrical body, as too are corresponding first and second end cutting edges. The first and second peripheral cutting edges have first and second radial rake angles, and the first and second end cutting edges have first and second axial rake angles. The first radial rake angle is larger than the second radial rake angle, and the first axial angle is smaller than the second axial rake angle. This arrangement permits a cutting resistance to be evenly distributed onto all cutting edges of the end mill, thereby preventing chattering.

Each of the prior art inventions discussed above offer different solutions with respect to reducing or preventing chatter by employing a cutting tool with a single geometrical configuration.

It is an object of the present invention to provide an indexable cutting insert which can be used in a rotating cutting tool, specifically a milling cutter, where more than one geometrical configuration can be achieved by indexing at least one of the cutting inserts within the same insert receiving pocket, to offer an alternative solution in reducing vibration and chatter whilst maintaining optimized operating parameters.

It is also an object of the present invention to provide an indexable cutting insert with more than one main cutting edge, where more than one cutter axial rake angle can be achieved by indexing the cutting insert within the same insert receiving pocket of the milling cutter body.

It is another object of the present invention to provide an indexable cutting insert with more than one main rake surface, where more than one cutter radial rake angle can be achieved by indexing the cutting insert within the same insert receiving pocket of the milling cutter body.

SUMMARY OF THE INVENTION

In accordance with preferred embodiments of the present invention, there is provided an indexable cutting insert, comprising:

an upper surface and an opposing lower surface, with a peripheral side surface extending therebetween;

a clamping through bore extending between and opening out to the upper surface and lower surface, the clamping bore having an insert axis around which the cutting insert is indexable;

at least two major cutting edges formed on an upper peripheral edge at the intersection of the upper surface and the peripheral side surface, having at least two index planes containing the insert axis and intersecting the at least two major cutting edges;

at least two rake points where the at least two index planes intersect the at least two major cutting edges; and at least two insert axial rake angles $\alpha 1$, $\alpha 2$ between lines tangential to the at least two major cutting edges at the at least two rake points and a lower plane defined by the lower surface, wherein an index angle equal to $360°/n$ is present between the at least two index planes, where n is the number of major cutting edges, and wherein at least two of the at least two insert axial rake angles $\alpha 1$, $\alpha 2$ are different.

Also in accordance with preferred embodiments of the present invention, there is provided an indexable cutting insert, comprising:

an upper surface and an opposing lower surface, with a peripheral side surface extending therebetween;

a clamping through bore extending between and opening out to the upper surface and lower surface, the clamping bore having an insert axis around which the cutting insert is indexable;

at least two major cutting edges formed on an upper peripheral edge at the intersection of the upper surface and the peripheral side surface;

at least two major rake surfaces formed on the upper surface adjacent each of the at least two major cutting edges, having at least two central planes which contain the insert axis and, in a top view of the cutting insert, are perpendicular to the at least two major cutting edges; and at least two rake surface profile angles β1, β2 between lines collinear, at least in the vicinity of the at least two major cutting edges, with cross section profiles of the at least two major rake surfaces taken through the at least two central planes, and a lower plane defined by the lower surface, wherein at least two of the at least two rake surface profile angles β1, β2 are different.

Also in accordance with preferred embodiments of the present invention, there is provided an indexable cutting insert, comprising:

an upper surface and an opposing lower surface with a peripheral side surface extending therebetween;

an insert axis extending between the upper surface and lower surface;

upper and lower peripheral edges formed at the intersection of the peripheral side surface and the upper and lower surfaces, respectively;

at least two major cutting edges formed on at least one of the upper and lower peripheral edges;

at least two rake points on the at least two major cutting edges sharing a same position relative to the insert axis when each of the at least two major cutting edges is oriented to a common index position; and at least two insert axial rake angles α1, α2 between lines tangential to the at least two major cutting edges at the at least two rake points and a lower plane defined by the lower surface, wherein at least two of the at least two insert axial rake angles α1, α2 are different.

Also in accordance with preferred embodiments of the present invention, there is provided an indexable cutting insert for use in a milling cutter, comprising:

an upper surface and an opposing lower surface, with a peripheral side surface extending therebetween;

an insert axis extending between the upper surface and lower surface;

upper and lower peripheral edges formed at the intersection of the peripheral side surface and the upper and lower surfaces, respectively;

at least two major cutting edges formed on at least one of the upper and lower peripheral edges;

at least two major rake surfaces formed on at least one of the upper surface and lower surfaces adjacent each of the at least two major cutting edges, having at least two central planes which contain the insert axis and, in a top view of the cutting insert, are perpendicular to the at least two major cutting edges; and at least two rake surface profile angles β1, β2 between lines collinear, at least in the vicinity of the at least two major cutting edges, with cross section profiles of the at least two major rake surfaces taken through the at least two central planes, and a lower plane defined by the lower surface, wherein at least two of the at least two rake surface profile angles β1, β2 are different.

In accordance with preferred embodiments of the present invention, there is provided a milling cutter comprising:

a milling cutter body having a plurality of insert receiving pockets and an equal number of identical indexable cutting inserts, each insert receiving pocket having a pocket seat surface inclined at a same pocket angle θ, θ' with a central longitudinal axis; and each identical cutting insert removably seated in one of the plurality of insert receiving pockets, having at least:

two major cutting edges including an active major cutting edge; and two associated major rake surfaces including an active major rake surface;

wherein:

in a radial plane perpendicular to the longitudinal axis, at least two of the identical cutting inserts have at least one of:

dissimilar cutter axial rake angles α1', α2'; and dissimilar cutter radial rake angles δ1, δ2.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
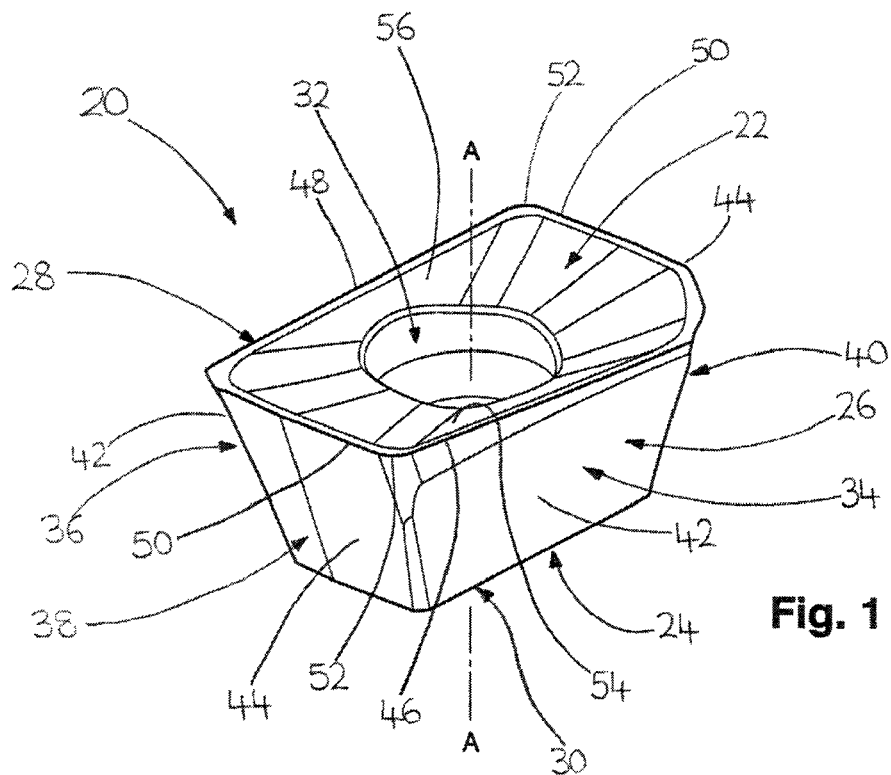
FIG. 1 is of a perspective view of a cutting insert in accordance with a first embodiment of the present invention.

Attention is drawn to FIG. 1, showing an indexable cutting insert 20 which may be manufactured by form pressing and sintering a cemented carbide, such as tungsten carbide, and may be coated or uncoated.

The cutting insert 20 has an upper surface 22 and an opposing lower surface 24 which defines a lower plane P, with a peripheral side surface 26 extending in between. Upper and lower peripheral edges 28 and 30 are formed at the intersection of the peripheral side surface 26 with the upper surface 22 and lower surface 24, respectively. A clamping through bore 32 extends between and opens out to the upper surface 22 and lower surface 24. The cutting insert 20 may be indexed around an insert axis A coaxial with the clamping through bore 32.

The peripheral side surface 26 has opposing first and second side surfaces 34 and 36, and opposing first and second end surfaces 38 and 40. Each of the opposing first and second side surfaces 34 and 36 may include identical side abutment surfaces 42 which are substantially planar. Each of the opposing first and second end surfaces 38 and 40 may include identical end abutment surfaces 44 which are substantially planar.

The upper peripheral edge 28 has a first major cutting edge 46 adjacent the first side surface 34 and a second major cutting edge 48 adjacent the second side surface 36. The upper peripheral edge 28 may have two identical minor cutting edges 50 adjacent each of the opposing first and second end surfaces 38 and 40, and two identical corner cutting edges 52 joining each of the first and second major cutting edges 46 and 48 with the respective minor cutting edge 50. The upper surface 22 has first and second major rake surfaces 54 and 56 adjacent each of the first and second major cutting edges 46 and 48 respectively.

Figure 2:
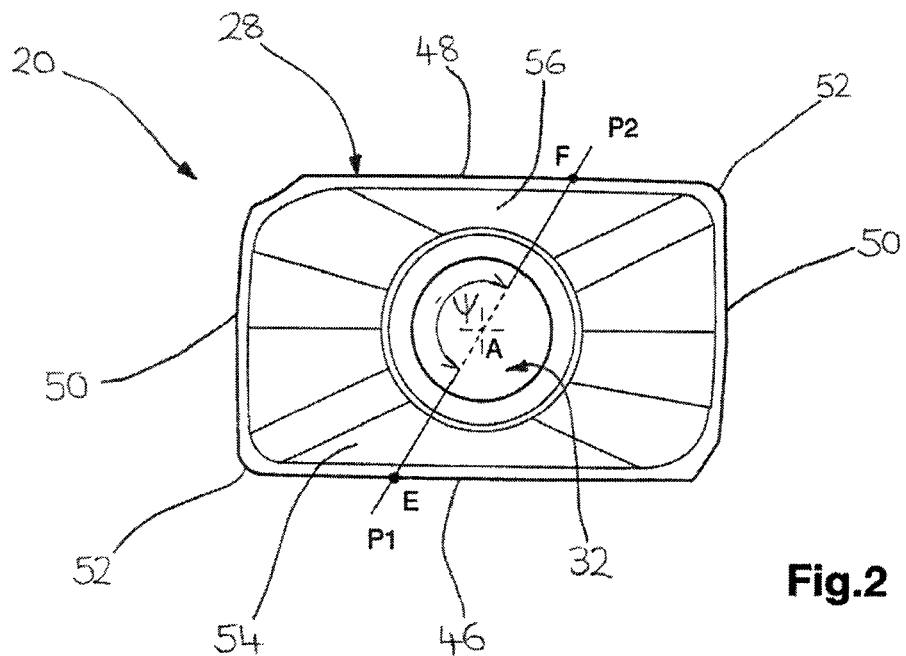
FIG. 2 is a top view of the cutting insert shown in FIG. 1.
Figure 3:
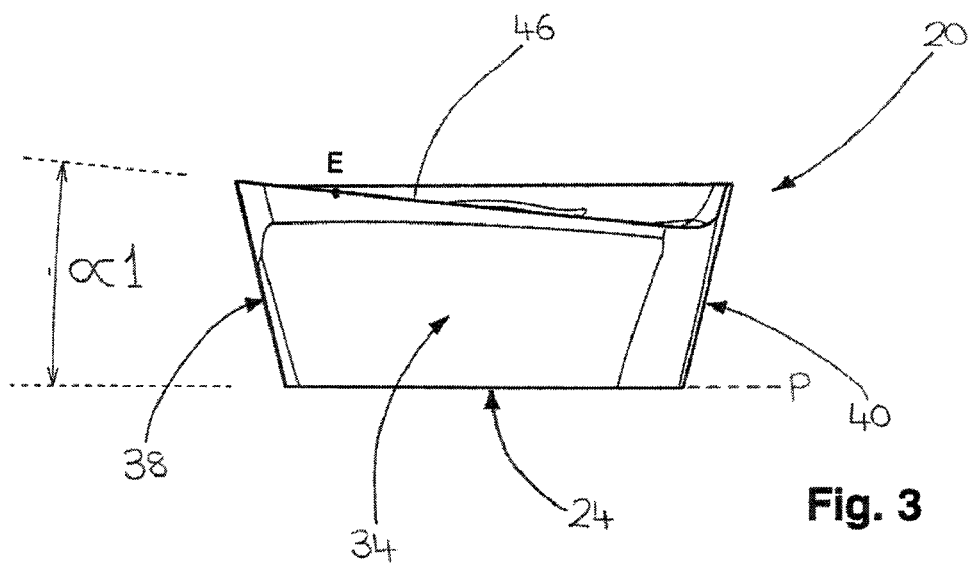
FIG. 3 is a side view of a first side surface of the cutting insert shown in FIG. 1.
Figure 4:
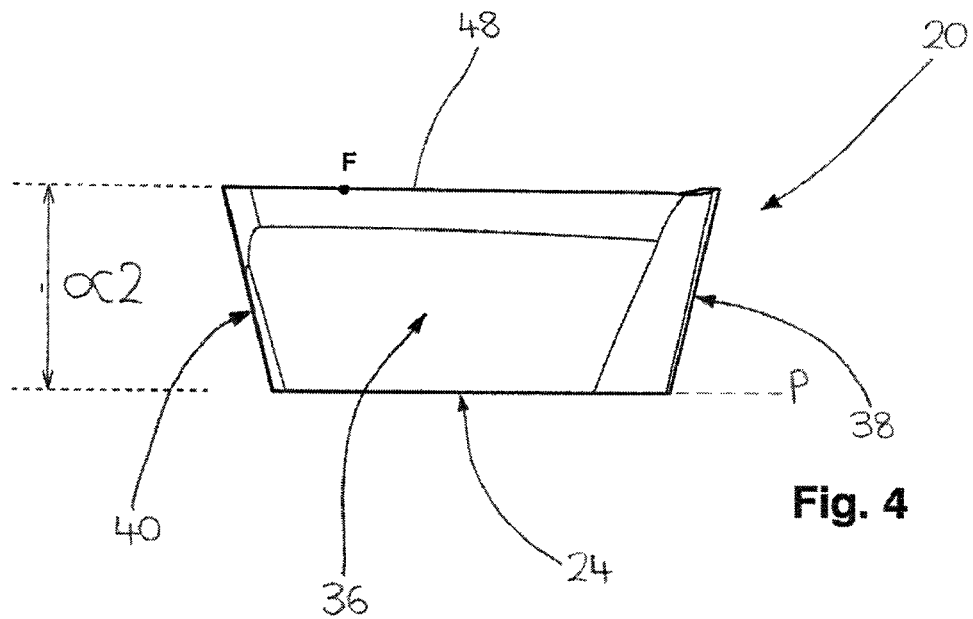
FIG. 4 is a side view of a second side surface of the cutting insert shown in FIG. 1.

According to a first embodiment of the present invention as shown in FIGS. 2, 3 and 4, a first insert axial rake angle α1 is present between a line tangential to the first major cutting edge 46 at a first rake point E and the lower plane P, and a second insert axial rake angle α2 is present between a line tangential to the second major cutting edge 48 at a second rake point F and the lower plane P, where the first insert axial rake angle α1 is greater than the second insert axial rake angle α2. Thus, the first and second insert axial rake angles angle α1, angle α2 have different magnitudes. The first rake point E is on a first index plane P1 which contains the insert axis A, and the second rake point F is on a second index plane P2 which also contains the insert axis A and has an index angle ψ with the first index plane P1. The index angle ψ is equal to 360°/n, where n represents the number of major cutting edges 46, 48, and for this embodiment n=2 meaning ψ=180°, such that the first rake point E and the second rake point F share a same position relative to the insert axis A when indexed 180°. The first and second insert axial rake angles α1 and α2 may be substantially constant along the length of the first and second major cutting edges 46 and 48 respectively.

The above definition of an "insert axial rake angle" enables the major cutting edges of the indexable cutting insert to be compared at equivalent rake points when the cutting insert is 'in hand'.

The following references to "cutter axial rake angle" refer to the 'true' axial rake angle as measured between a line tangential to the major cutting edge at a rake point and the longitudinal axis of the milling cutter.

Figure 5:
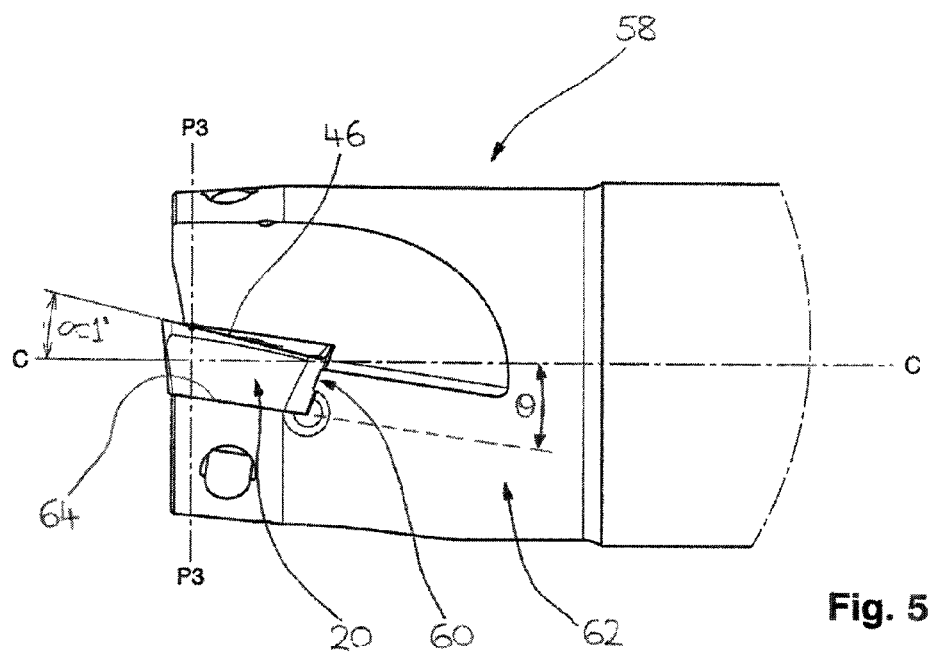
FIG. 5 is a side view of a milling cutter, with the cutting insert in accordance with the first embodiment in a first index position.
Figure 6:
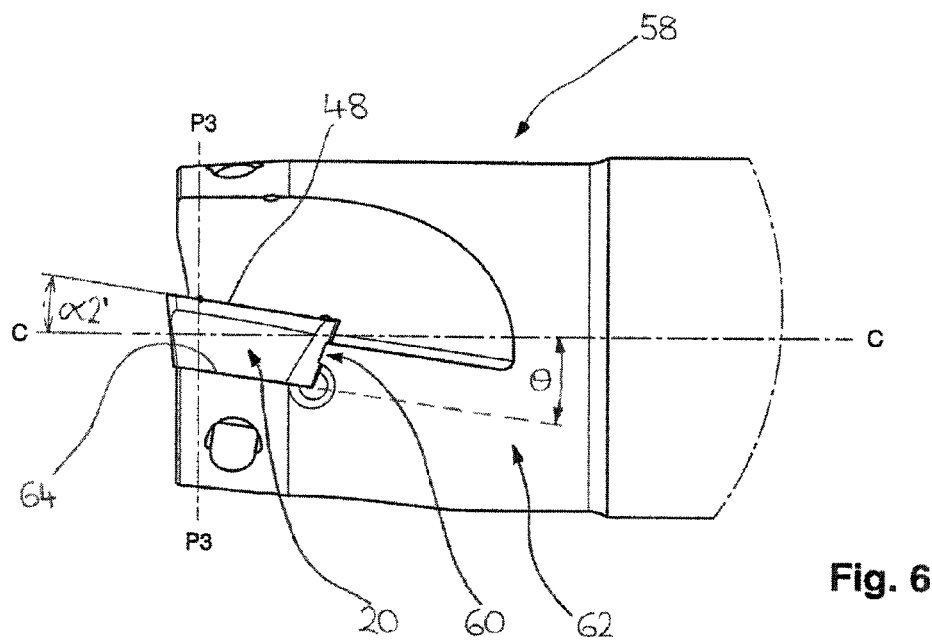
FIG. 6 is a side view of the milling cutter, with the cutting insert in accordance with the first embodiment in a second index position.

Attention is now drawn to FIGS. 5 and 6, showing a milling cutter 58 with the cutting insert 20 in a first and second index position respectively, removably seated within a given insert receiving pocket 60 of a milling cutter body 62. The milling cutter body 62 has three identical insert receiving pockets 60, each insert receiving pocket 60 having a substantially planar pocket seat surface 64 inclined at a same pocket angle θ with a central longitudinal axis C. In FIG. 5 the first major cutting edge 46 is in an active position and has a first cutter axial rake angle α1', whereas in FIG. 6 the second major cutting edge 48 is in the active position and has a second cutter axial rake angle a2', where the first cutter axial rake angle α' is greater than the second cutter axial rake angle α2'. Thus, the first and second cutter axial rake angles α1', α2' have different magnitudes. The first and second cutter axial rake angles α1' and α2' are measured at rake points on the first and second major cutting edges 46 and 48 respectively, sharing the same radial plane P3 perpendicular to the longitudinal axis C of the milling cutter body 62, and may be substantially constant along the length of the first and second major cutting edges 46 and 48.

The milling cutter 58 may have, for example, a milling cutter body 62 with three identical insert receiving pockets 60, wherein three identical cutting inserts 20 can be retained in one of two index positions to provide the following possible cutting tool configurations: (i) three cutting inserts 20 having the first major cutting edge 46 with first cutter axial rake angle α1' active; (ii) three cutting inserts 20 having the second major cutting edge 48 with second cutter axial rake angle α2' active; (iii) two cutting inserts 20 having the first major cutting edge 46 with first cutter axial rake angle α1' active and one cutting insert 20 having the second major cutting edge 48 with second cutter axial rake angle α2' active; and (iv) one cutting insert 20 having the first major cutting edge 46 with first cutter axial rake angle α1' active and two cutting inserts 20 having the second major cutting edge 48 with second cutter axial rake angle α2' active. Thus, the most appropriate cutting tool configuration with respect to different combinations of axial rake angle of the cutting inserts can be selected using a single set of identical cutting inserts 20 In particular, configurations (iii) and (iv) could be used to reduce/eliminate chatter whilst providing optimized operating parameters.

Figure 7:
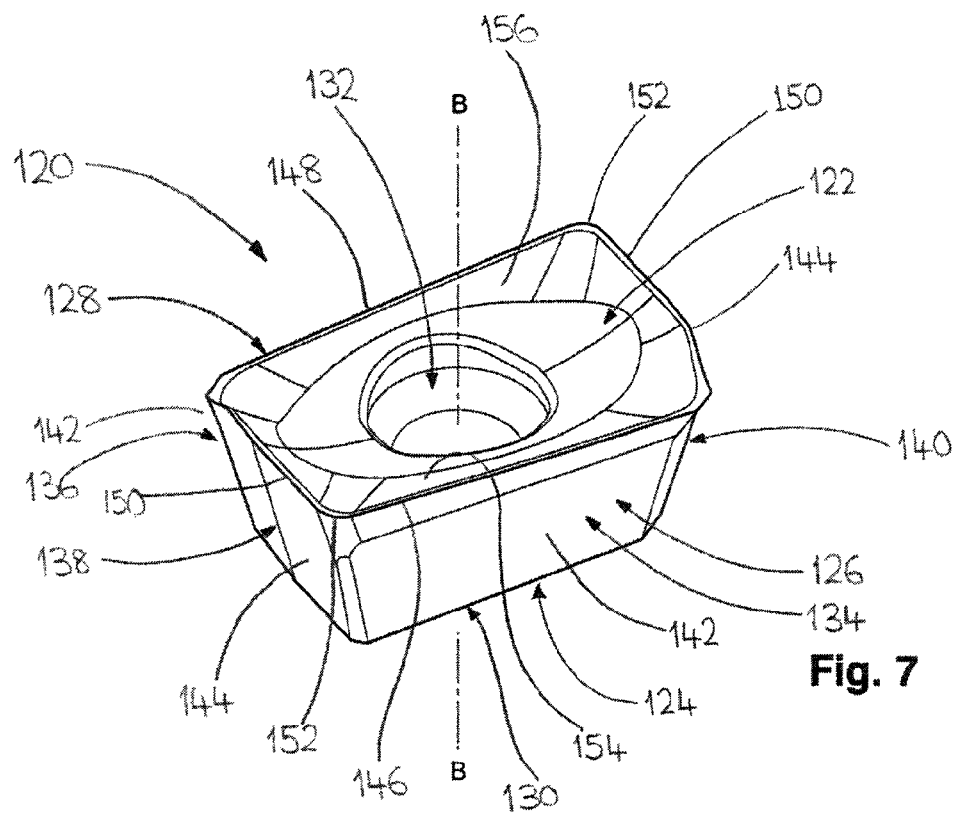
FIG. 7 is of a perspective view of a cutting insert in accordance with a second embodiment of the present invention.
Figure 8:
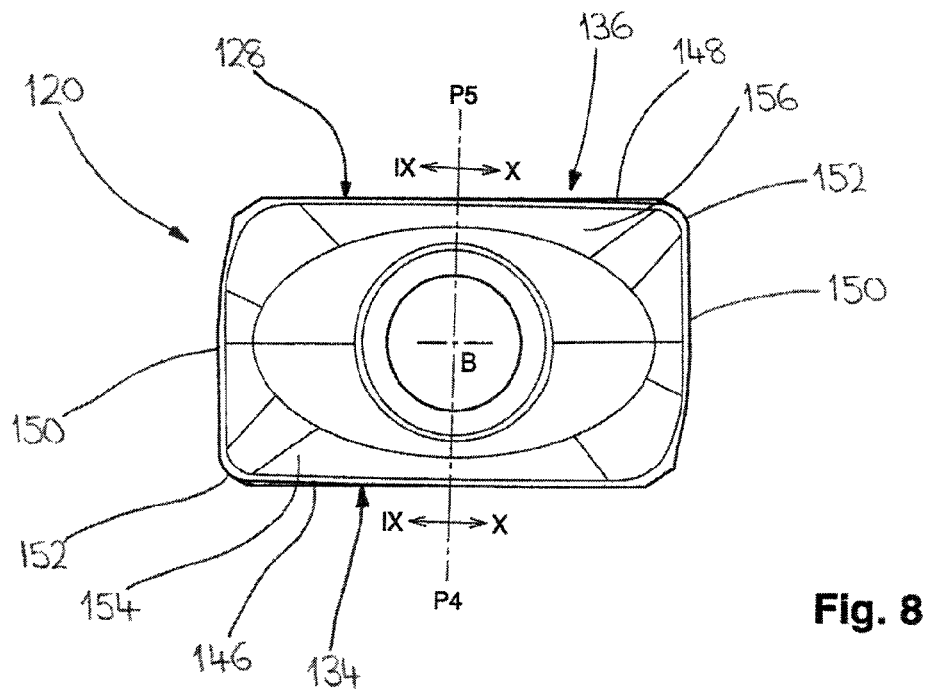
FIG. 8 is a top view of the cutting insert shown in FIG. 7.

Attention is drawn to FIGS. 7 and 8, showing an indexable cutting insert 120 with an upper surface 122 and an opposing lower surface 124 which defines a lower plane P', and a peripheral side surface 126 extending in between. Upper and lower peripheral edges 128 and 130 are formed at the intersection of the peripheral side surface 126 with the upper surface 122 and lower surface 124, respectively. A clamping through bore 132 extends between and opens out to the upper surface 122 and lower surface 124. The cutting insert 120 may be indexed around an insert axis B coaxial with the clamping through bore 132.

The peripheral side surface 126 has opposing first and second side surfaces 134 and 136, and opposing first and second end surfaces 138 and 140. Each of the opposing first and second side surfaces 134 and 136 may include identical side abutment surfaces 142 which are substantially planar. Each of the opposing first and second end surfaces 138 and 140 may include identical end abutment surfaces 144 which are substantially planar.

The upper peripheral edge 128 has a first major cutting edge 146 adjacent the first side surface 134 and a second major cutting edge 148 adjacent the second side surface 136. The upper peripheral edge 128 may have two identical minor cutting edges 150 adjacent each of the opposing first and second end surfaces 138 and 140, and two identical corner cutting edges 152 joining each of the first and second major cutting edges 146 and 148 with the respective minor cutting edge 150. The upper surface 122 includes first and second major rake surfaces 154 and 156 adjacent each of the first and second major cutting edges 146 and 148 respectively.

Figure 9:
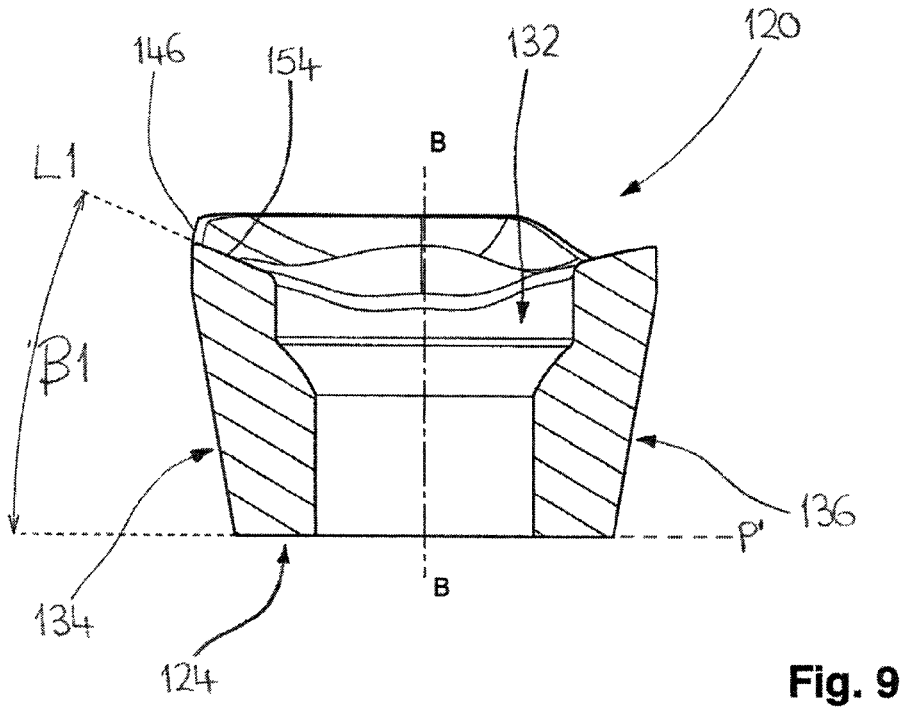
FIG. 9 is a cross sectional view of the cutting insert shown in FIG. 8 taken along the line IX-IX.
Figure 10:
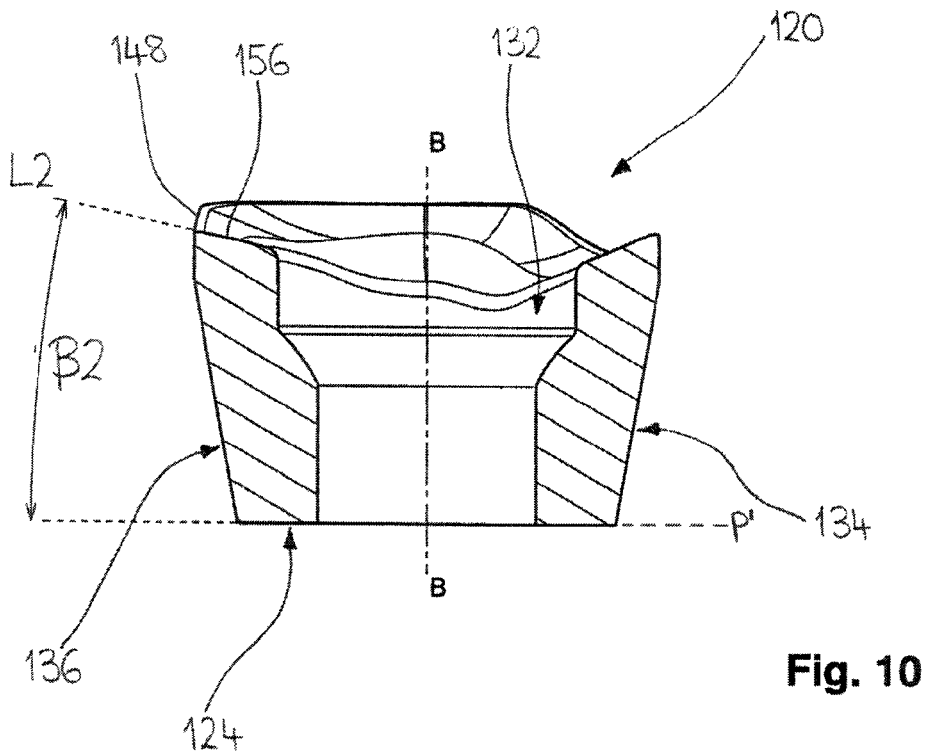
FIG. 10 is a cross sectional view of the cutting insert shown in FIG. 8 taken along the line X-X.
Figure 11:
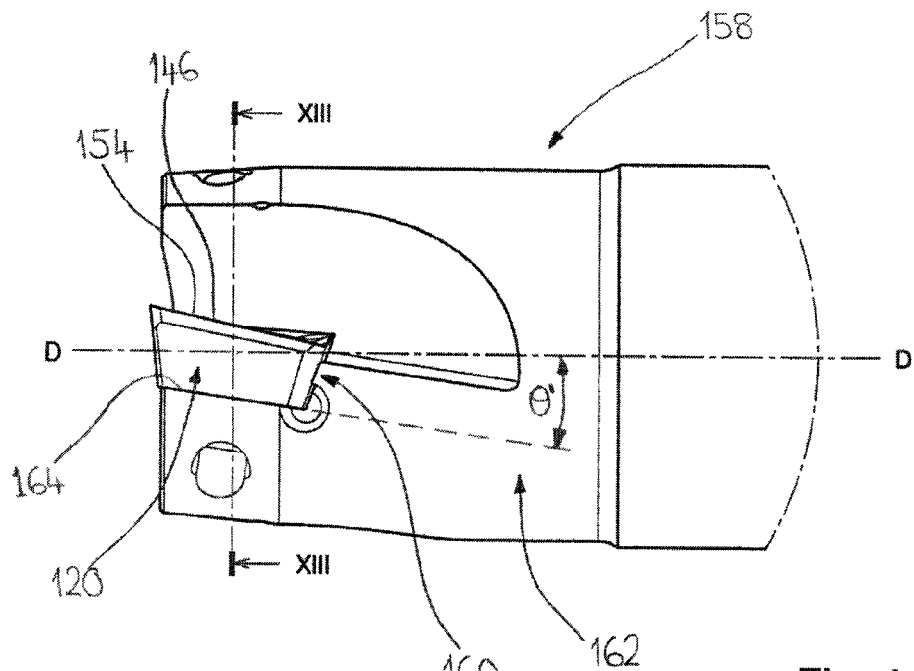
FIG. 11 is a side view of a milling cutter, with the cutting insert in accordance with the second embodiment in a first index position.
Figure 12:
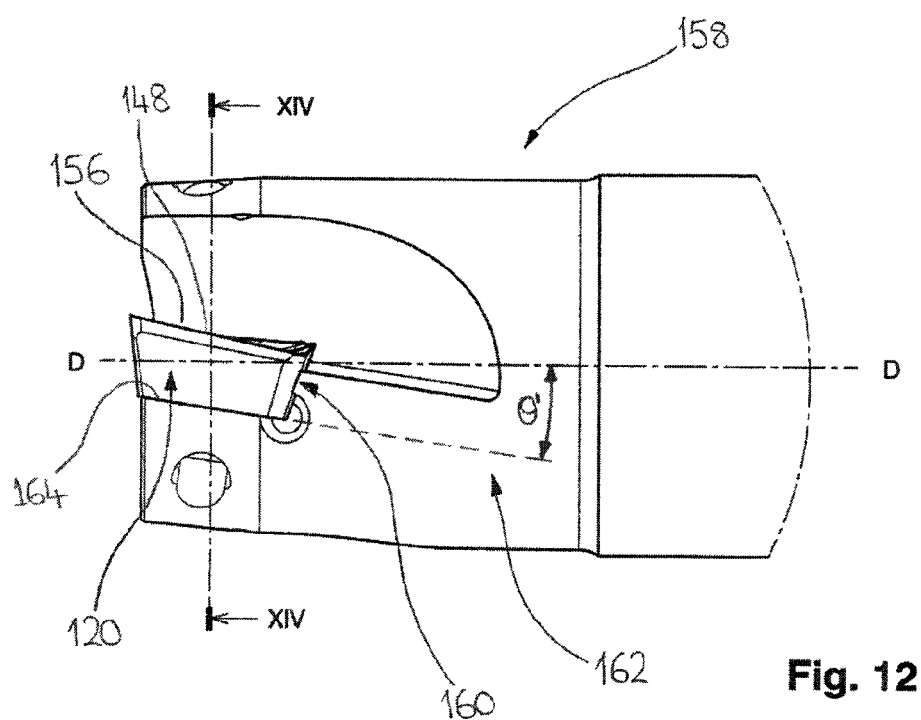
FIG. 12 is a side view of the milling cutter, with the cutting insert in accordance with the second embodiment in a second index position.

According to a second embodiment of the present invention as shown in FIGS. 9 and 10, a first rake surface profile angle β1 is present between a first line L1 collinear with a cross section profile of the first major rake surface 154, at least in the vicinity of the first major cutting edge 146, and the lower plane P', and a second rake surface profile angle β2 is present between a second line L2 collinear with a cross section profile of the second major rake surface 156, at least in the vicinity of the first major cutting edge 148, and the lower plane P'. As seen in FIGS. 9 and 10, the first and second rake surface profile angles β1, β2 have different magnitudes, with β1 being greater than β2. The first and second lines L1 and L2 lie on first and second central planes P4 and P5 which contain the insert axis B and, in the top view of the cutting insert as seen in FIG. 8, are perpendicular to the first and second major cutting edges 146 and 148, respectively.

The above definition of a "rake surface profile angle" enables the rake surfaces of the indexable cutting insert to be compared at equivalent cross sections when the cutting insert is 'in hand'. It should be understood that the definition of a "rake surface profile angle" can also apply to rake surfaces immediately adjacent cutting edges referred to as 'lands'.

The following references to "cutter radial rake angle" refer to the 'true' radial rake angle as measured at a section passing through a point anywhere along a major cutting edge as the angle between its associated rake surface and a radius with respect to the axis of the milling cutter.

Figure 13:
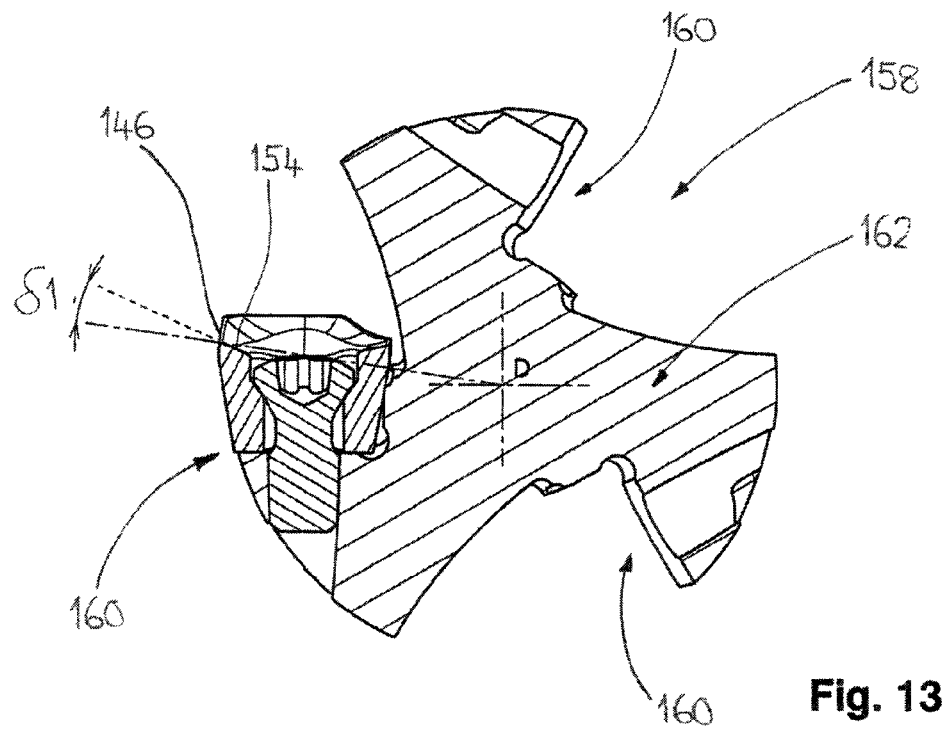
FIG. 13 is a cross sectional view of the milling cutter shown in FIG. 11 taken along the line XIII-XIII.
Figure 14:
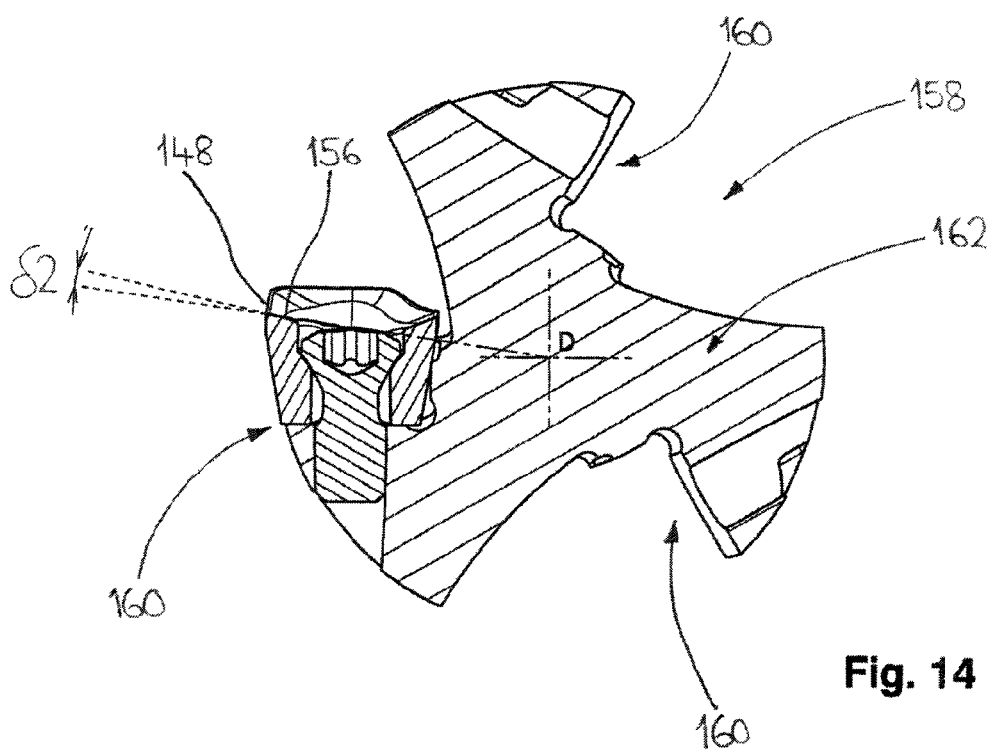
FIG. 14 is a cross sectional view of the milling cutter shown in FIG. 12 taken along the line XIV-XIV.

FIGS. 11, 13 and 12, 14 show a milling cutter 158 with the cutting insert 120 in a first and second index position respectively, removably seated within a given insert receiving pocket 160 of a milling cutter body 162. The milling cutter body 162 has three identical insert receiving pockets 160, each insert receiving pocket 160 having a substantially planar pocket seat surface 164 inclined at a same pocket angle θ' with a central longitudinal axis D. In FIG. 13 the first major rake surface 154 is in an active position and has a first cutter radial rake angle δ1, which is substantially constant along the first major cutting edge 146, whereas in FIG. 14 the second major rake surface 156 is in the active position and has a second cutter radial rake angle δ2, which is substantially constant along the second major cutting edge 148, where the first cutter radial rake angle δ1 is greater than the second cutter radial rake angle δ2. Thus, the first and second cutter radial rake angles δ1, δ2 have different magnitudes.

The milling cutter 158 may have, for example, a milling cutter body 162 with three identical insert receiving pockets 160, wherein three identical cutting inserts 120 can be retained in one of two index positions to provide the following possible cutting tool configurations: (i) three cutting inserts 120 having the first major rake surface 154 with first cutter radial rake angle δ1 active; (ii) three cutting inserts 20 having the second major rake surface 156 with second cutter radial rake angle δ2 active; (iii) two cutting inserts 20 having the first major rake surface 154 with first cutter radial rake angle δ1 active and one cutting insert 20 having the second major rake surface 156 with second cutter radial rake angle δ2 active; and (iv) one cutting insert 20 having the first major rake surface 154 with first cutter radial rake angle δ1 active and two cutting inserts 20 having the second major rake surface 156 with second cutter radial rake angle δ2 active. Thus, the most appropriate cutting tool configuration with respect to different combinations of cutter radial rake angles can be selected using a single set of identical cutting inserts 120. In particular, configurations (iii) and (iv) could be used to reduce/eliminate chatter whilst providing optimized operating parameters.

Although the present invention has been described to a certain degree of particularity, it should be understood that various alterations and modifications could be made without departing from the spirit or scope of the invention as hereinafter claimed.

What is claimed is:

1. An indexable cutting insert, comprising:
   an upper surface and an opposing lower surface, with a peripheral side surface extending therebetween;
   a clamping through bore extending between and opening out to the upper surface and the lower surface, the clamping through bore having an insert axis around which the cutting insert is indexable;
   at least two major cutting edges formed on an upper peripheral edge at the intersection of the upper surface and the peripheral side surface,
   at least two index planes containing the insert axis and intersecting the at least two major cutting edges;
   at least two rake points where the at least two index planes intersect the at least two major cutting edges; and
   at least two insert axial rake angles ($\alpha 1$, $\alpha 2$) between lines tangential to the at least two major cutting edges at the at least two rake points and a lower plane defined by the lower surface,
   wherein an index angle $\psi$ equal to 360°/n is present between the at least two index planes, where n is the number of major cutting edges, and
   wherein at least two of the at least two insert axial rake angles ($\alpha 1$, $\alpha 2$) have different magnitudes.

2. The cutting insert according to claim 1, having:
   at least two major rake surfaces formed on the upper surface adjacent each of the at least two major cutting edges;
   at least two central planes which contain the insert axis and, in a top view of the cutting insert, are perpendicular to the at least two major cutting edges; and
   at least two rake surface profile angles ($\beta 1$, $\beta 2$) between lines collinear, at least in the vicinity of the at least two major cutting edges, with cross section profiles of the at least two major rake surfaces taken through the at least two central planes, and the lower plane,
   wherein at least two of the at least two rake surface profile angles ($\beta 1$, $\beta 2$) have different magnitudes.

3. The cutting insert according to claim 1, wherein the peripheral side surface comprises opposing first and second side surfaces and opposing first and second end surfaces.

4. The cutting insert according to claim 3, wherein the at least two major cutting edges are formed along portions of the upper peripheral edge adjacent the first and second side surfaces.

5. The cutting insert according to claim 1, comprising:
   two major cutting edges; wherein:
   each of the two major cutting edges has an associated minor cutting edge formed on the upper peripheral edge.

6. The cutting insert according to claim 5, wherein each of the two major cutting edges and two minor cutting edges share a corner cutting edge.

7. The cutting insert according to claim 6, wherein the two minor cutting edges and the two corner cutting edges are identical.

8. An indexable cutting insert, comprising:
   an upper surface and an opposing lower surface, with a peripheral side surface extending therebetween;
   a clamping through bore extending between and opening out to the upper surface and lower surface, the clamping bore having an insert axis around which the cutting insert is indexable;
   at least two major cutting edges formed on an upper peripheral edge at the intersection of the upper surface and the peripheral side surface;
   at least two major rake surfaces formed on the upper surface adjacent each of the at least two major cutting edges,
   at least two central planes which contain the insert axis and, in a top view of the cutting insert, are perpendicular to the at least two major cutting edges; and
   at least two rake surface profile angles ($\beta 1$, $\beta 2$) between lines collinear, at least in the vicinity of the at least two major cutting edges, with cross section profiles of the at least two major rake surfaces taken through the at least two central planes, and a lower plane defined by the lower surface, wherein at least two of the at least two rake surface profile angles (β1, β2) have different magnitudes.

9. The cutting insert according to claim 8, having at least two index planes containing the insert axis and intersecting the at least two major cutting edges;
at least two rake points where the at least two index planes intersect the at least two major cutting edges; and
at least two insert axial rake angles (α1, α2) between lines tangential to the at least two major cutting edges at the at least two rake points and the lower plane,
wherein an index angle ψ equal to 360°/n is present between the at least two index planes, where n is the number of major cutting edges, and
wherein at least two of the at least two insert axial rake angles (α1, α2) have different magnitudes.

10. The cutting insert according to claims 1 and 9, wherein the at least two insert axial rake angles (α1, α2) are substantially constant along the length of the at least two major cutting edges.

11. A milling cutter comprising:
a milling cutter body having a plurality of insert receiving pockets and an equal number of identical indexable cutting inserts,
each insert receiving pocket having a substantially planar pocket seat surface inclined at a same pocket angle (θ, θ') with a central longitudinal axis; and
each identical cutting insert removably seated in one of the plurality of insert receiving pockets, having at least:
two major cutting edges including an active major cutting edge; and
two associated major rake surfaces including an active major rake surface, wherein:
in a radial plane perpendicular to the central longitudinal axis, at least two of the identical cutting inserts have at least one of:
cutter axial rake angles (α1', α2') having different magnitudes; and
cutter radial rake angles (δ1, δ2) having different magnitudes.

12. The milling cutter according to claim 11, wherein the milling cutter body has a plurality of identical insert receiving pockets.

13. The milling cutter according to claim 11, wherein the cutter radial rake angles (δ1, δ2) associated with the at least two identical cutting inserts are substantially constant along the length of the at least two active major cutting edges.

14. The milling cutter according to claim 11, wherein the cutter axial rake angles (α1', α2') associated with the at least two identical cutting inserts are substantially constant along the length of the at least two active major cutting edges.

15. An indexable cutting insert, comprising:
an upper surface and an opposing lower surface, with a peripheral side surface extending therebetween;
an insert axis extending between the upper surface and lower surface;
upper and lower peripheral edges formed at the intersection of the peripheral side surface and the upper and lower surfaces, respectively;
at least two major cutting edges formed on at least one of the upper and lower peripheral edges;
at least two rake points on the at least two major cutting edges sharing a same position relative to the insert axis when each of the at least two major cutting edges is oriented to a common index position; and
at least two insert axial rake angles (α1, α2) between lines tangential to the at least two major cutting edges at the at least two rake points and a lower plane defined by the lower surface,
wherein at least two of the at least two insert axial rake angles (α1, α2) have different magnitudes.

16. An indexable cutting insert for use in a milling cutter, comprising:
an upper surface and an opposing lower surface, with a peripheral side surface extending therebetween;
an insert axis extending between the upper surface and lower surface;
upper and lower peripheral edges formed at the intersection of the peripheral side surface and the upper and lower surfaces, respectively;
at least two major cutting edges formed on at least one of the upper and lower peripheral edges;
at least two major rake surfaces formed on at least one of the upper surface and lower surfaces adjacent each of the at least two major cutting edges,
at least two central planes containing which contain the insert axis and, in a top view of the cutting insert, are perpendicular to the at least two major cutting edges; and
at least two rake surface profile angles (β1, β2) between lines collinear, at least in the vicinity of the at least two major cutting edges, with cross section profiles of the at least two major rake surfaces taken through the at least two central planes, and a lower plane defined by the lower surface,
wherein at least two of the at least two rake surface profile angles (β1, β2) have different magnitudes.

* * * * *